J. ROBERTS.
COMBINATION HINGED ROOF FOR BOX CARS.
APPLICATION FILED AUG. 14, 1916.
1,243,979.
Patented Oct. 23, 1917.
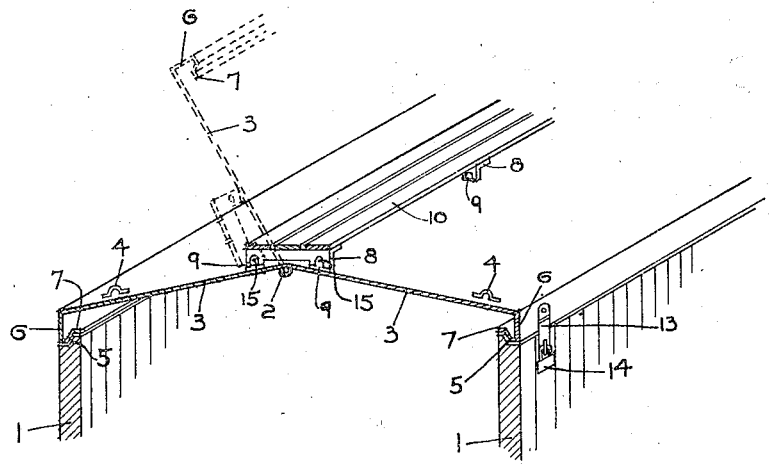
·FIGURE·1·
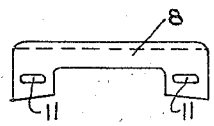 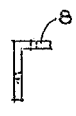 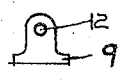 
·FIG·2·   ·FIG·3·   ·FIG·4·   ·FIG·5·
Inventor
J. Roberts
Witnesses
Pearl M. Roberts
J. B. Harpman
By C. W. Harpman
his Attorney

UNITED STATES PATENT OFFICE.

JOSEPH ROBERTS, OF YOUNGSTOWN, OHIO.

COMBINATION HINGED ROOF FOR BOX-CARS.

1,243,979. Specification of Letters Patent. Patented Oct. 23, 1917.

Application filed August 14, 1916. Serial No. 114,692.

*To all whom it may concern:*

Be it known that I, JOSEPH ROBERTS, a citizen of the United States, residing at Youngstown, in the county of Mahoning and State of Ohio, have invented certain new and useful Improvements in Combination Hinged Roofs for Box-Cars, of which the following is a specification.

The present invention relates to improvements in combination hinged roof for box-cars also coal-cars, the object of the invention being to provide a hinged roof for cars whereby to protect the contents of the car from theft and the weather, and which can be conveniently opened for the purpose of loading the car.

A further object of the invention is to provide an L-shaped member supported by two support legs, one face of the L-shaped member provided with slots near each end, the other surface provided with holes for the purpose of bolting thereto the foot board of the car, this L-shaped member being attached to the car by pins passing through the support legs and the slots above mentioned, this L-shaped member thus forming a support when either half of the roof is swung upwardly upon its central hinge far enough to be without the center of gravity.

A further object of my invention is to provide an L-shaped member as above described which may be used in combination with another form of hinged roof, such roof allowing both sides to be opened at the same time so that the entire car may be loaded at once.

With these objects in view the invention consists in certain novel features of construction and combinations and arrangements of parts as hereinafter set forth, and pointed out in the claims.

In the accompanying drawings Figure 1 is a perspective view taken in section of my improved car.

Figs. 2, 3, 4 and 5 are detail views.

The car body is represented by 1. See Fig. 1. The car roof is hinged to a support bar 2 which is securely attached to the end portion of the car 1. Upon this support bar 2 is hinged the roof members 3. The lifts 4 are attached near the outer edge of the roof members 3. The top edge of the car 1 is formed with a shoulder 5 upon which rests the end of the roof members 3 which are formed to fit upon the shoulder 5 thereby making a weather tight fitting. By referring to Fig. 1 it will be seen that the outer portions 6 of the roof members 3 are downturned and have their edge 7 inturned so as to fit upon a flange shoulder 5 said flange 5 being formed upon the upper edge of sides of car walls.

The running board 10 is attached to the top of the car 1 by means of brackets 8 which are attached to the support legs 9 and held in position by pins 15.

It will be seen by referring to Fig. 2 that the bracket 8 is provided with slotted openings near the ends of the bracket.

In operation, when it is desired to open either of the roof members 3, the lock 14 is removed from the hasp 13. By lifting upwardly upon the lift 4 the roof members 3 turns upon the bar 2. Attached to the roof portions of the car 3 and located an equal distance from the central portion of the car are support legs 9. The brackets 8 are attached to the support legs 9 by means of a bolt or pin 15 passing through a hole 12 at the upper end of the support legs 9 and through slots 11 located in the leg portions of the brackets 8. When the roof members 3 are down in position the pins 15 fit loosely to the outer ends of the slots 11. As the roof member 3 is lifted it will be seen that the distance between the support legs 9 will be shortened thereby causing the pins 15 to travel to the inner ends of the slots 11.

It will be noticed by referring to Fig. 1 that the bracket 8 not only acts as a prop when the roof member 3 is in an open position but also acts as a weight in conjunction with the running board 10 which resists any pressure or force against the roof member 3 which might tend to close the same.

Having thus described my invention, what I claim and desire to secure by Letters Patent is:

1. In a combination hinged roof for box cars, a central rod, hinged roof portions hinged to said central rod, upper edge of side of car formed with a seat, outer ends of the hinged roof portions formed with inturned members fitting upon above mentioned seat, support legs firmly bolted to the hinged portion of roof, brackets pinned to said support legs, said brackets provided with slots at ends of downturned portions of same, a running board bolted to the top of said brackets, as set forth for the purposes specified.

2. In a device of the class described a central rod, roof portions hinged to said central rod, upper edge of side of wall formed with a seat, outer ends of the hinged roof portions formed with inturned members fitting upon above mentioned seat, support legs firmly bolted to the hinged portion of the roof, brackets attached to said support legs, said brackets provided with slots at ends of downturned portions of same, pins passing through upper ends of support legs and the slots, a running board bolted to the top of said brackets, the above mentioned support legs fastened to the roof portions of the car and located an equal distance from the central portion of the car.

In testimony whereof I affix my signature in the presence of two witnesses.

JOSEPH ROBERTS.

Witnesses:
C. A. HARPMAN,
M. H. ECKERT.